(12) United States Patent
Pechyony et al.

(10) Patent No.: US 9,569,401 B2
(45) Date of Patent: Feb. 14, 2017

(54) PARALLEL TRAINING OF A SUPPORT VECTOR MACHINE (SVM) WITH DISTRIBUTED BLOCK MINIMIZATION

(71) Applicant: Akamai Technologies, Inc., Cambridge, MA (US)

(72) Inventors: Dmitry Pechyony, Belmont, MA (US); Libin Shen, Needham, MA (US); Rosie Jones, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 607 days.

(21) Appl. No.: 13/707,305

(22) Filed: Dec. 6, 2012

(65) Prior Publication Data

US 2013/0144817 A1 Jun. 6, 2013

Related U.S. Application Data

(60) Provisional application No. 61/567,179, filed on Dec. 6, 2011.

(51) Int. Cl.
*G06F 15/18* (2006.01)
*G06N 99/00* (2010.01)

(52) U.S. Cl.
CPC .............. *G06F 15/18* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,571,225 B1 * | 5/2003 | Oles et al. ...................... | 706/12 |
| 7,519,563 B1 * | 4/2009 | Urmanov et al. ............... | 706/12 |
| 2007/0179927 A1 * | 8/2007 | Vaidyanathan ...... | G06K 9/6269 |
| 2009/0304268 A1 * | 12/2009 | Cadambi et al. ............. | 382/159 |
| 2013/0290223 A1 * | 10/2013 | Chapelle et al. ............... | 706/12 |
| 2013/0339156 A1 * | 12/2013 | Sanjay et al. .............. | 705/14.66 |

\* cited by examiner

*Primary Examiner* — Kakali Chaki
*Assistant Examiner* — Michael Zidanic
(74) *Attorney, Agent, or Firm* — David H. Judson

(57) ABSTRACT

A method to solve large scale linear SVM that is efficient in terms of computation, data storage and communication requirements. The approach works efficiently over very large datasets, and it does not require any master node to keep any examples in its memory. The algorithm assumes that the dataset is partitioned over several nodes on a cluster, and it performs "distributed block minimization" to achieve the desired results. Using the described approach, the communication complexity of the algorithm is independent of the number of training examples.

12 Claims, 4 Drawing Sheets

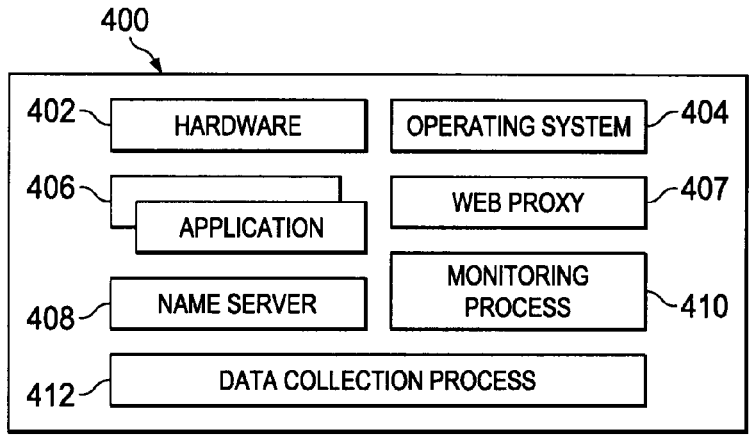

FIG. 4

THE FOLLOWING IS ALGORITHM 1, WITH INPUT:
    THE $i$TH SLAVE NODE HAS A BLOCK $\{B_i\}_i^k=1$: THE
    MASTER NODE HAS A FEASIBLE SOLUTION $w^1$ OF (1)
1: for t=1,2,...do
2: SEND $w^t$ FROM THE MASTER NODE TO $k$ SLAVE NODES
3: for $i$=1 to $k$, IN PARALLEL do
4: AT THE $i$TH SLAVE NODE: SOLVE (5) FOR $B_i$ AND OBTAIN $d^i$
    SEND $\Delta w_i^t = \Sigma_{r \in B_i} d_r^i y_r x_r$ TO THE MASTER NODE;
    SET $\alpha_i^{t+1} = \alpha_i^t + 1/k * d^i$
5: end for
6: SET $w^{t+1} = w^t + \frac{1}{k} \Sigma_{i=1}^k \Delta w_i^t$
7: end for THE FOLLOWING IS ALGORITHM 2 (UTILIZING THE SAME INPUT AS IN ALGORITHM 1):
1: for $t$=1,2,...do
2: SEND $w^t$ FROM THE MASTER NODE TO $k$ SLAVE NODES
3: for $i$=1 to $k$, IN PARALLEL do
4: AT THE $i$TH SLAVE NODE: SOLVE (5) FOR $B_i$ AND OBTAIN $d^i$
    SEND $\Delta w_i^t = \Sigma_{r \in B_i} d_r^i y_r x_r$ TO THE MASTER NODE;
    SET $\alpha_i^{t+1} = \alpha_i^t + 1/k * d^i$
5: end for
6: FIND $\lambda^* = \arg \min_{0 \leq \lambda \leq 1} f_p(w^t + \lambda \Sigma_{i=1}^k \Delta w_i^t)$
    SET $w^{t+1} = w^t + \lambda^* \Sigma_{i=1}^k \Delta w_i^t$
7: end for

FIG. 5

PARALLEL TRAINING OF A SUPPORT VECTOR MACHINE (SVM) WITH DISTRIBUTED BLOCK MINIMIZATION

BACKGROUND

Technical Field

This disclosure relates generally to machine learning algorithms and, in particular, to algorithms for use in training Support Vector Machines (SVMs).

Background of the Related Art

The Support Vector Machine (SVM) is one of the most robust machine-learning algorithms developed to date, and it is one of the most commonly-used ones. Over the last 15 years, algorithms for training SVMs have been evolving from being scalable to thousands of examples, to being scalable to millions. Nevertheless, current state-of-the-art sequential linear SVM solvers are relatively slow if they are trained over tens of millions of high-dimensional examples. The scalability of the state-of-the-art sequential solvers of nonlinear SVM is even worse.

It is also known to perform distributed SVM training. Prior attempts in distributed SVM training have focused on parallelizing particular steps of sequential solvers. Most of these approaches focused on parallelizing the solvers of nonlinear SVMs. Attempts to parallelize the solvers of linear SVMs have required keeping the entire dataset in the memory of a master node. This constraint limits the size of the training set to one that will fit into memory.

BRIEF SUMMARY

This disclosure provides for a method to solve large scale linear SVM that is efficient in terms of computation, data storage and communication requirements. The approach works efficiently over very large datasets, and it does not require any master node to keep any examples in its memory. The algorithm assumes that the dataset is partitioned over several nodes on a cluster, and it performs "distributed block minimization" to achieve the desired results. Using the described approach, the communication complexity of the algorithm is independent of the number of training examples.

According to an embodiment, a method to solve the linear SVM operates in a cluster of nodes, the cluster comprising a first (master) node, and a set of second (slave) nodes. Typically, each node in the cluster comprises a computing entity having a hardware processor and a memory. The method begins by partitioning a dataset comprising blocks of data over the set of second nodes, with each second node having a block of the dataset. Then, for each of a set of iterations, a series of sub-steps of an algorithm are performed as follows. Initially, and at each respective second node, and concurrently for all second nodes, an optimization problem is solved with respect to the block of the dataset associated with the respective second node to generate an update. After solving the optimization problem (at each second node), each respective second node forwards its update to the first node. The first node then processes the updates received from the second nodes to generate a result. The updates may be processed by averaging, or by a line search. The result is then forwarded back from the first node to each respective second node for use by the second node in a next iteration in the set of iterations.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which:

FIG. 4 is a representative CDN edge machine configuration; and

FIG. 5 depicts pseudocode for algorithms that may be implemented in accordance with the techniques herein.

DETAILED DESCRIPTION

The technique described herein may be implemented in a "distributed" network of computing entities.

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Figure 1:
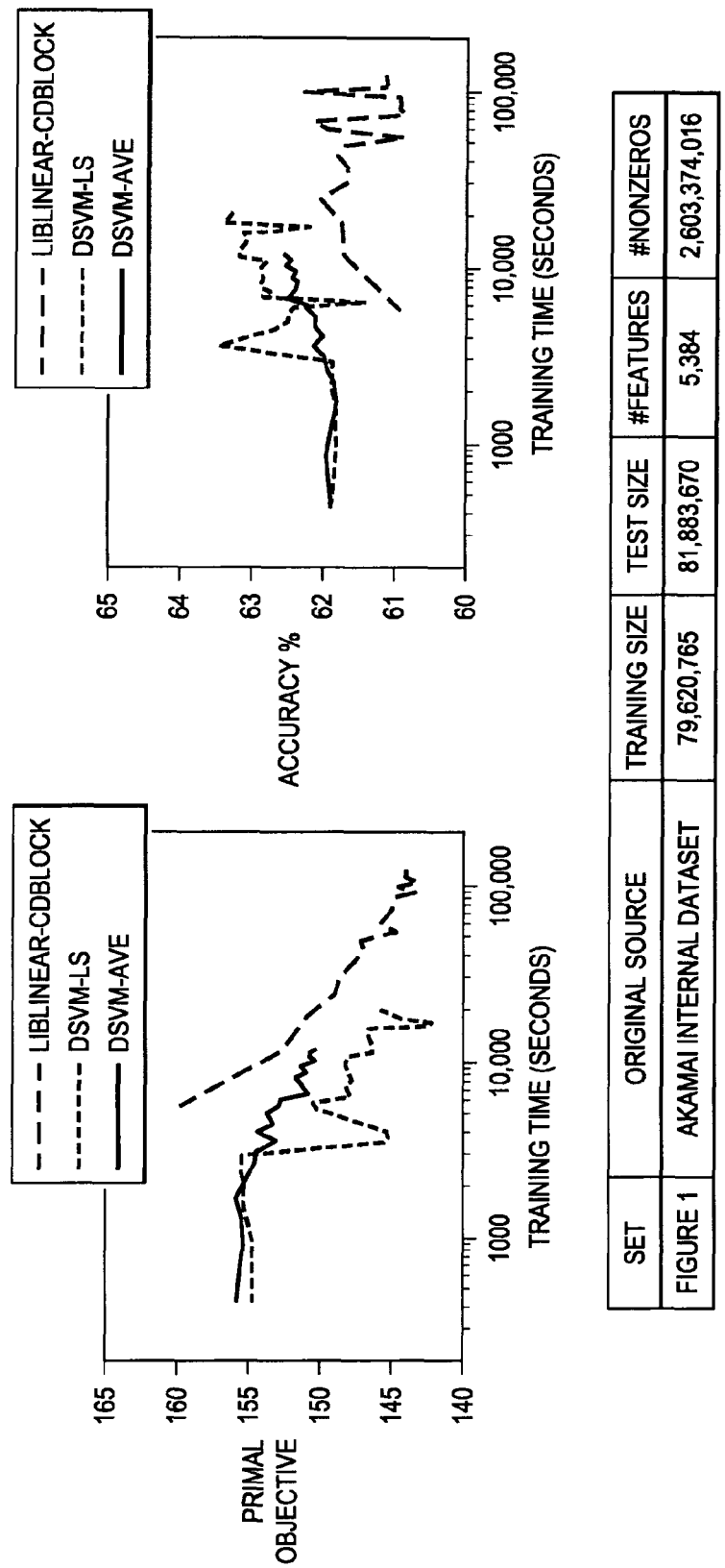
FIG. 1 illustrates experimental results on a first dataset using the techniques of this disclosure.
Figure 2:
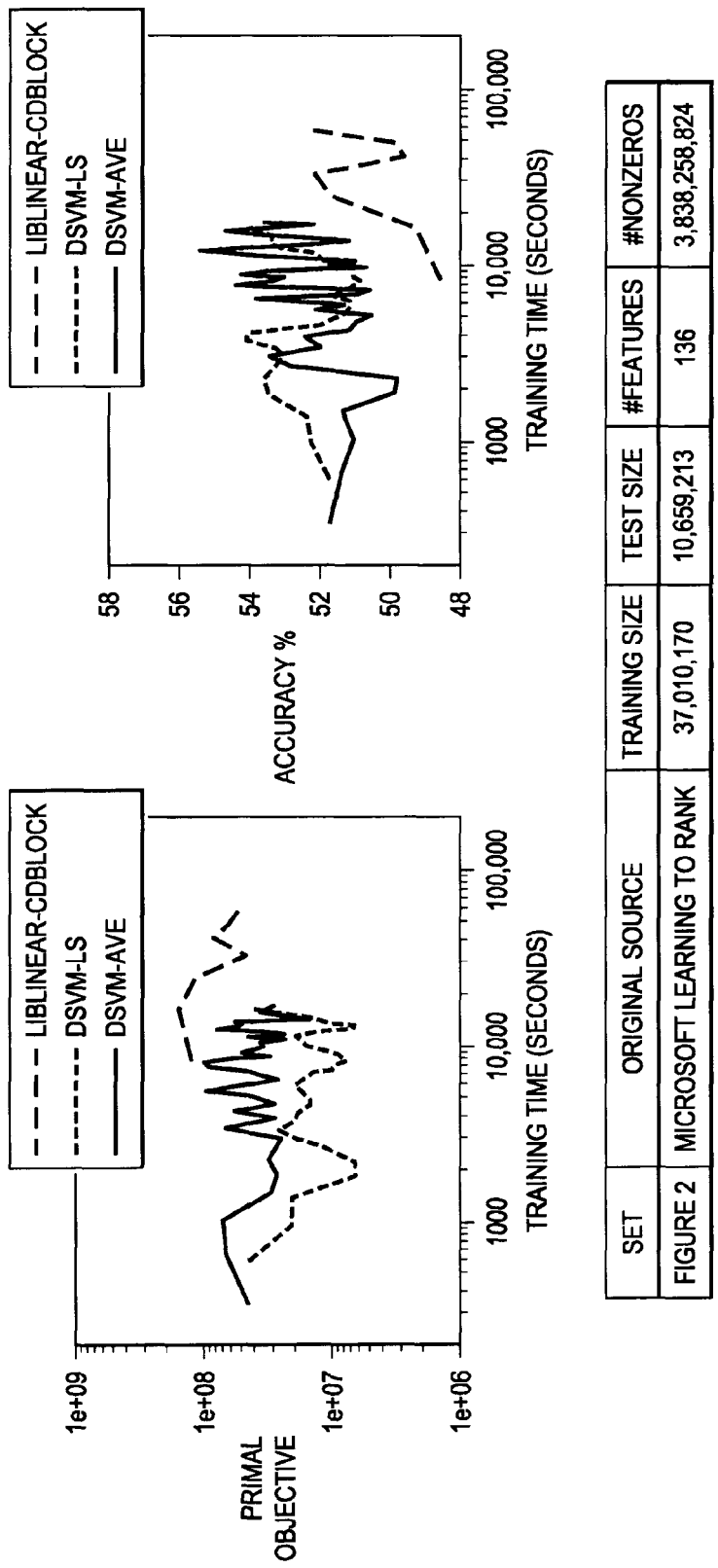
FIG. 2 illustrates experimental results on a second dataset using the techniques of this disclosure.
Figure 3:
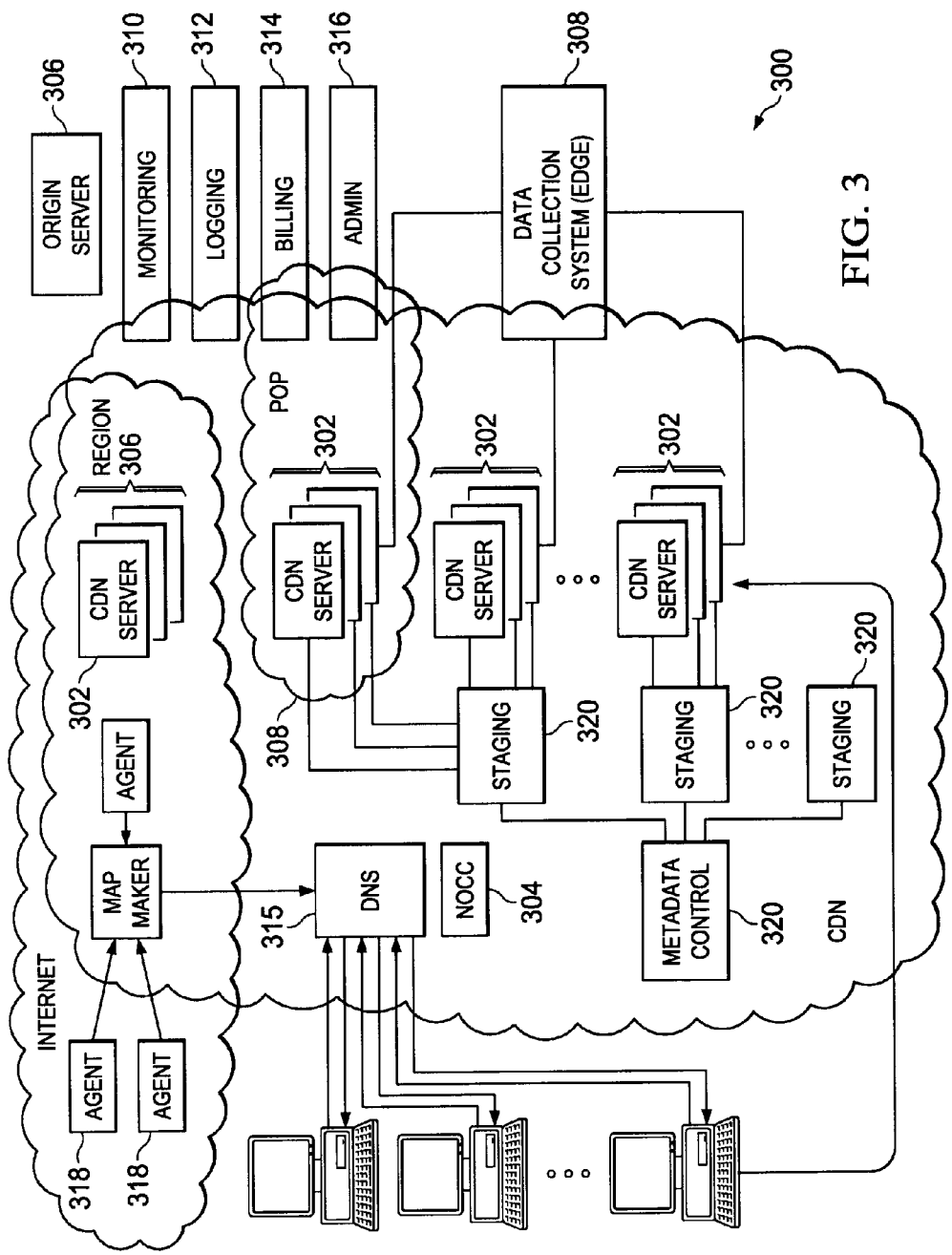
FIG. 3 is a block diagram illustrating a known distributed computer system configured as a content delivery network (CDN)

In a known system, such as shown in FIG. 3, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

As illustrated in FIG. 4, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

By way of further background, the techniques herein may be implemented in any cloud compute environment. Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

In machine learning, support vector machines (SVMs, also known as support vector networks) are supervised learning models that use learning algorithms that analyze data and recognize patterns. The basic SVM takes a set of input data and predicts, for each given input, which of two possible classes forms the output. Thus, typically an SVM functions as a non-probabilistic binary linear classifier. In operation, and given a set of training examples, each marked as belonging to one of two categories, an SVM training algorithm builds a model that assigns new examples into one category or the other. An SVM model is a representation of the examples as points in space, mapped so that the examples of the separate categories are divided by a clear gap that is as wide as possible. New examples are then mapped into that same space and predicted to belong to a category based on which side of the gap they fall on.

The following section provides a review of sequential block minimization for solving SVM.

Let $'T=\{(x_i',y_i))\}_{i=1}^n, x_i' \in \mathbb{R}^d, y_i \in \{+1,-1\}$ be a training set. A linear SVM generates a classifier $h(x')=w'^T x'+b$, where $w \in \mathbb{R}^d$ and $b \in \mathbb{R}$. Let $w=[w';b]$ and $x=[x';1]$. Then $h(x)=w^T x$. The vector w is obtained by solving $\min_{w \in \mathbb{R}^d} f_P(w) = \|w\|_2^2/2 + C\Sigma_{i=1}^n \max(1-y_i w^T x_i, 0)$. The corresponding dual optimization problem is $$\min_{\alpha \in \mathbb{R}^n} f_D(\alpha) = \alpha^T Q \alpha / 2 - e^T \alpha, \quad (1)$$

$$\text{s.t.} \forall\ 1 \leq i \leq n,\ 0 \leq \alpha_i \leq C,$$

where $Q_{ij}=y_i y_j x_i x_j$ and $e=[1, \ldots 1]^T$. Given the dual solution $\alpha$, the primal one is $$w = \sum_{i=1}^n y_i a_i x_i. \quad (2)$$

Let $\{B_i\}_{i=1}^k$ be a fined partition of 'T and the corresponding dual variables $\alpha$ into k blocks. These blocks are disjoint and $\cup_{i=1}^n B_i='T$. We overload the notation and refer to $B_i$ both as a set of indices and a set of corresponding training examples. (1) can be solved using sequential block minimization (SBM): at each iteration we consider a block $B_i$ and solve (1) only for the variables in $B_i$. The remarkable fact is that when solving (1) for the variables in $B_i$ we do not need to keep in memory the variables from other blocks. We now describe this observation in more details, since our forthcoming distributed algorithm is heavily based on it.

Let $\alpha^t \in \mathbb{R}^d$ be a solution of (1) after t iterations. Suppose that at the (t+1)-th iteration we are optimizing (1) for the variables in $B_i$, and $d^i=\alpha^{t+1}-\alpha^t$. The direction $d^i$ has nonzero values only in the coordinates from $B_i$ and is found by solving $$\min_{d^i \in \mathbb{R}^n} (\alpha^t + d^i)^T Q(\alpha^t + d^i)/2 - e^T(\alpha^t + d^i) \quad (3)$$

$$\text{subject to } \forall\ j \in B_i,\ 0 \leq \alpha_j^t + d_j^i \leq C,\ \forall\ j \notin B_i,\ d_j^i = 0.$$

Let $d_{B_i}$ be a vector of $|B_i|$ nonzero coordinates of $d^i$ that correspond to the indices in $B_i$. The objective (3) is equivalent to $$d_{B_i}^T Q_{B_i,B_i} d_{B_i}/2+(\alpha^t)^T Q_{:,B_i} d_{B_i}-e^T d_{B_i}, \quad (4)$$

where $Q_{B_i,B_i}$ is a submatrix of Q with all the indices in $B_i$ and $Q_{:,B_i}$ is a submatrix of Q with the column indices being in $B_i$. It follows from (2) that for any $1 \leq j \leq n$, $\alpha^T Q_{:,j}=y_j(w^t)^T x_j$, where $w^t$ is a primal solution after t iterations. Let $X_{B_i}$ be a $d \times |B_i|$ matrix. The j-th column of $X_{B_i}$ is the j-th example in $B_i$, multiplied by its label. Then the second term of (4) is $w^T X_{B_i} d_{B_i}$ and we obtain that in order to solve (3) for the variables in $B_i$ we need to solve $$\min_{d_{B_i}} d_{B_i}^T Q_{B_i,B_i} d_{B_i}/2 + (w^t)^T X_{B_i} d_{B_i} - e^T d_{B_i} \quad (5)$$

$$\text{subject to } \forall\ j \in B_i,\ 0 \leq \alpha_j^t + d_j^i \leq C.$$

To solve (5) we only need to keep in memory the examples from the block $B_i$ and the d-dimensional vector $w^t$. After solving (5) the vector $w^t$ is updated as $w^{t+1}=w^t+\Sigma_{j \in B_i} d_j^i y_j x_j$. In summary, at the (t+1)-th iteration SBM solves (5) for a single $B_i$ and then updates $w^t$ using the last formula.

With the above as background, the distributed block minimization (DBM) approach of this disclosure is now described in detail. As summarized above, the DBM algorithm works as follows. The algorithm executes through a series of iterations. The following sub-steps are performed at an iteration of the algorithm. In particular, at each respective second node, and concurrently for all second nodes (that are then being used), the optimization problem (equation (5) above) is solved with respect to the block of the dataset associated with the respective second node to generate an update. After solving the optimization problem (at each second node), each respective second node forwards its update to the first node. The first node then processes the updates received from the second nodes to generate a result. The updates may be processed by averaging (Algorithm 1, referred to herein as DSVM-AVE), or by a line search (Algorithm 2, referred to herein as DSVM-LS). The result is then forwarded back from the first node to each respective second node for use by the second node in a next iteration in the set of iterations.

Algorithms 1 and 2 are specified in the pseudo-code (©2012, Akamai Technologies, Inc., all rights reserved) depicted in FIG. 5. This code may be implemented as computer software, namely, as program code executing on the slave and master nodes. The algorithms are identical save for step (6), with DSVM-AVE based on "averaging" and DSVM-LS based on "line search."

In distributed block minimization (DBM), at each iteration, we process all the blocks $B_i$, $1 \le i \le k$ simultaneously. This is done by solving (5) in parallel on k slave nodes. We denote by $\alpha_i^t$ the local version of $\alpha^t$ at the ith slave node. $\alpha_i^t$ has nonzero values only in the indices from $B_i$. The ith node computes $d^i$ and the difference $\Delta w_i^t = \Sigma_{r \in B_i} d_r^i y_r x_r$ between the current primal solution $w^t$ and the new one. Then $\Delta w_i^t$ is sent from the ith slave node to the master node. Upon receiving $\{\Delta w_i^t\}_{i=1}^k$ the master node computes the new primal solution $w^{t+1} = w^t + \Sigma_{i=1}^k \Delta w_i^t / k$ and sends it back to the slave nodes. We denote this straightforward algorithm as DSVM-AVE and describe it formally at Algorithm 1.

We now provide a justification for 1/k multiplier. Let $f_D(\alpha^t) + \lambda d^i \nabla f_D(\alpha^t)$ be a linear approximation of $g_i(\lambda) = f_D(\alpha^t + \lambda d^i)$. Since $d^i$ solves (5). $\lambda = 1$ minimizes $g_i(\lambda)$. We would like to find $\mu$ that will minimize $g(\mu) = f_D(\alpha^t + \mu \Sigma_{i=1}^k d^i)$. We have that $$g(\mu) = f_D\left(\alpha^t + \mu \sum_{i=1}^k d^i\right) \approx f_D(\alpha^t) + \sum_{i=1}^k \mu d^i \nabla f_D(\alpha^t)$$

$$= \frac{1}{k} \sum_{i=1}^k f_D(\alpha^t) + \frac{1}{k} \sum_{i=1}^k k\mu d^i \nabla f_D(\alpha^t)$$

$$= \frac{1}{k} \sum_{i=1}^k (f_D(\alpha^t) + k\mu d^i \nabla f_D(\alpha^t))$$

$$\approx \frac{1}{k} \sum_{i=1}^k g_i(k\mu).$$

Since $\mu = 1/k$ minimizes each of $g_i(k\mu)$, we assume that $\mu = 1/k$ approximately minimizes $g(\mu)$. Combining this further with (2) we obtain the update rule $$w^{t+1} = w^t + \frac{1}{k} \sum_{i=1}^k \sum_{j \in B_i} d_j^i y_j x_i$$

DSVM-AVE.

Let $d = \Sigma_{i=1}^k d^i$. Another way of updating $w^t$ is to do a line search along the direction $$\overline{w} = \sum_{i=1}^k \Delta w_i^t = \sum_{i=1}^n d_i y_i x_i.$$

The resulting algorithm, denoted as DSVM-LS, is formalized at Algorithm 2. Note that the direction $\overline{w}$ might not be a descent direction in the primal space. We now explain this effect in more details. Since each slave node solves (5), for any $1 \le i \le k$, $f_D(\alpha^t + d^i) < f_D(\alpha^t)$. Using the convexity of $f_D(\alpha)$ we have that $d^i \cdot \nabla f_D(\alpha^t) < 0$. Therefore $\Sigma_{i=1}^k d^i \cdot \nabla f_D(\alpha^t) = d^T Q \alpha^t - d^T e < 0$. But it follows from (2) and (6) that $$\overline{w}^T \nabla f_P(w^t) = \qquad (7)$$

$$\overline{w}^T w^t - C\overline{w}^T \sum_{i:1-y_i w^t \cdot x_i > 0} y_i x_i = d^T Q \alpha^t - C\overline{w}^T \sum_{i:1-y_i w^t \cdot x_i > 0} y_i x_i.$$

In general it is possible that (7) is not negative and thus $\overline{w}$ is not a descent direction. For example, if the last sum is empty and $d = \alpha^t$ then (7) reduces to $(\alpha^t)^T Q \alpha^t$. Since Q is positive-semidefinite, the last expression is not negative. A more general conclusion from this derivation is that if d is a descent direction in the dual space then the corresponding primal direction $\overline{w} = \Sigma_{i=1}^n d_i y_i x_i$ is not necessary a descent direction in the primal space. Nevertheless, we observe in our experiments that there are iterations when $\overline{w}$ is a descent direction and this allows DSVM-LS to optimize $f_P(w)$.

It can be verified that at each outer iteration DSVM-AVE sends O(kd) bytes. Also, if the complexity of the line search is O(kd) (we show in the sequel how to achieve such complexity) then each iteration of DSVM-LS has the same communication complexity. Thus if the number of the outer iterations is constant then the communication complexity of these algorithms is independent of the training set size. In our experiments we observed that the number of outer iterations needed to achieve empirically good results is less than 20.

We implemented Algorithms 1 and 2 using the Map-Reduce framework on a Hadoop cluster. Each block optimization task is a mapper job. Line search is implemented as multi-round grid search with Map-Reduce on blocks. We used a fixed grid $\{\lambda_r\}_{r=1}^{20}$ of step sizes. At each iteration the master node receives from the slave ones the value of $\Delta w_i$, computes $\Sigma_{i=1}^k \Delta w_i$ and sends it to the slaves. Then each slave node i computes 20 values $er_{ir} = \Sigma_{j \in B_i}$ max(0, $1 - y_i (w + \lambda_r \Delta w)^T x_i$) and sends them to the master. Finally the master uses $er_{ir}$'s to choose the best step size.

We tested DBM on two large data sets, ADS and MSR. Their statistics are listed in Table. The ADS set is a proprietary dataset of Akamai. It has contains data for advertising modeling. The MSR dataset is transformed from Microsoft learning to rank dataset by pairwise sampling. We only use pairs whose ranks are consecutive. We use 20 blocks for ADS experiments, and 50 blocks for MSR. Such number of blocks guarantee that each block fits into memory.

FIGS. (1) and (2) show the primal objective function and the accuracy on the test set. The X axis represents the wall-clock time of training. Each box is the result of the iteration of LIBLINEAR-CDBLOCK, that passes over all blocks sequentially. Each circle/staris is result of the iteration of DSVM-LS/DSVM-AVE that processes all blocks in parallel. Since LIBLINEAR-CDBLOCK training is slow on these large datasets, we use logarithmic scale for the X axis. As shown in the graphs DSVM-LS converges more quickly than DSVM-AVE with the help of line search, and significantly faster than LIBLINEAR-CDBLOCK.

DSVM-AVE completed the first iteration in 613 seconds on ADS and in 337 seconds on MSR, and the first round results provided reasonably good performance. It took LIB-LINEAR-CDBLOCK 6.910 and 8,090 seconds respectively to complete the first iteration on each set. and its results are not as good as DSVM-AVE's. As to optimal values. DSVM-LS obtained better results in much less time as compared to LIBLINEAR-CDBLOCK, on both the objective function and test accuracy.

The techniques herein provide significant advantages over the prior art.

This disclosure describes a new algorithm for training linear Support Vector Machines (SVMs) over such large datasets. The algorithm assumes that the dataset is partitioned over several nodes on a cluster, and it performs a distributed block minimization along with the subsequent line search. The communication complexity of the algorithm is independent of the number of training examples. Indeed, in one implementation, the accurate training of SVM over the datasets of tens of millions of examples takes less than 11 minutes.

The techniques herein may be implemented on any distributed computing platform. The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The above-described algorithms may be combined with one another, or implemented discretely. One or more of the algorithms may be executed as local or remote processes on one or more computing entities. The system also preferably uses one or more data stores, databases or memory for storing training sets, data structures, computed data, and other relevant data.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A method, operative in a cluster of nodes, the cluster comprising a first node, and a set of second nodes, each node in the cluster comprising a computing entity having a hardware processor and a memory, the method comprising:
   partitioning a dataset comprising blocks of data over the set of second nodes, each second node having a block of the dataset, wherein the block of the dataset associated with a respective second node is larger than a size of the memory; and
   for each of a set of iterations:
   at each respective second node, and concurrently for all second nodes, solving an optimization problem with respect to the block of the dataset associated with the respective second node to generate an update;
   after solving the optimization problem, each respective second node forwarding its update to the first node;
   at the first node, processing the updates forwarded from the second nodes to generate a result; and
   forwarding the result from the first node back to each respective second node for use by the second node in a next iteration in the set of iterations;
   wherein the dataset is a training set for a support vector machine and comprises advertising modeling data.

2. The method as described in claim 1 wherein the updates are processed by averaging.

3. The method as described in claim 1 wherein the updates are processed by a line search.

4. The method as described in claim 1 wherein the cluster nodes comprise nodes of a distributed computer network.

5. An article comprising a non-transitory machine-readable medium that stores a program, the program being executable by one or more machines to perform operations comprising:
   partitioning a dataset comprising blocks of data over a set of slave nodes, each slave having a block of the dataset, wherein the block of the dataset associated with a respective slave node is larger than a size of a memory associated with the respective slave node; and
   for each of a set of iterations:
   at each respective slave node, and concurrently for all slave nodes, solving an optimization problem with respect to the block of the dataset associated with the respective slave node to generate an update;
   after solving the optimization problem, each respective slave node forwarding its update to a master node; and
   at the master node, processing the updates forwarded from the slave nodes to generate a result; and
   forwarding the result from the master node back to each respective slave node for use by the slave node in a next iteration in the set of iterations;
   wherein the dataset is a training set for a support vector machine and comprises advertising modeling data.

6. The article as described in claim 5 wherein the updates are processed by averaging.

7. The article as described in claim 5 wherein the updates are processed by a line search.

8. Apparatus, comprising:
   one or more processors;

computer memory holding computer program instructions executed by the one or more processors to carry out operations comprising:

partitioning a dataset comprising blocks of data over a set of slave nodes, each slave having a block of the dataset, wherein the block of the dataset associated with a respective slave node is larger than a size of a memory associated with the respective slave node; and for each of a set of iterations:

at each respective slave node, and concurrently for all slave nodes, solving an optimization problem with respect to the block of the dataset associated with the respective slave node to generate an update;

after solving the optimization problem, each respective slave node forwarding its update to a master node; and at the master node, processing the updates forwarded from the slave nodes to generate a result; and forwarding the result from the master node back to each respective slave node for use by the slave node in a next iteration in the set of iterations;

wherein the dataset is a training set for a support vector machine and comprises advertising modeling data.

9. The apparatus as described in claim 8 wherein the updates are processed by averaging.

10. The apparatus as described in claim 8 wherein the updates are processed by a line search.

11. The article as described in claim 5 wherein the slave nodes comprise nodes of a distributed computer network.

12. The apparatus as described in claim 8 wherein the slave nodes comprise nodes of a distributed computer network.

* * * * *